Jan. 21, 1964 T. F. RAESS ETAL 3,118,460
FLUID ACTUATED VALVE WITH EXPLOSIVE BLOCKING MEANS
Filed July 31, 1961 4 Sheets-Sheet 1

INVENTORS
THEODORE F. RAESS
VICTOR H. CARDER
NICKOLAS ANDRES

BY W. O. Quisenberry
Claude Funkhouser
ATTORNEYS

Jan. 21, 1964    T. F. RAESS ETAL    3,118,460
FLUID ACTUATED VALVE WITH EXPLOSIVE BLOCKING MEANS
Filed July 31, 1961    4 Sheets-Sheet 4

INVENTORS
THEODORE F. HAESS
VICTOR H. CARDER
NICKOLAS ANDRES

BY

ATTORNEYS

United States Patent Office 3,118,460
Patented Jan. 21, 1964

3,118,460
FLUID ACTUATED VALVE WITH EXPLOSIVE
BLOCKING MEANS
Theodore F. Raess, Saratoga, Victor H. Carder, Santa Clara, and Nickolas Andres, Campbell, Calif., assignors, by mesne assignments, to the United States of America as represented by the Secretary of the Navy
Filed July 31, 1961, Ser. No. 128,271
7 Claims. (Cl. 137—68)

The following invention relates to a valve for use in a missile launching ejection system. More particularly, it relates to a valve of the blocking and pressure-monitored type whereby the valve-rate and degree of opening may be programmed to provide a predetermined amount of launching fluid at a predetermined rate.

Missile launching from an underwater platform is a delicate art. The launching force should be varied according to the depth of the platform. The launching force in a system such as the instant one will depend upon both the amount and the pressure of the launching eject gas. This gas must be carefully and exactly controlled by a device which is substantially foolproof as well as precise. Such a device is the launching control and blocking valve of this case. The valve incorporates many vitally important features for underwater missile launching. It includes a safety locking device against the accidental opening operation of the valve to prevent the inadvertent launching of the missile, for example, from an inadvertent or unauthorized actuation of the launching system. This emergency block is further one which is able to open positively despite tremendous back pressures and other forces. This valve has a minimum of moving parts, providing another safe feature for its operation. The valve has an operating point which may be automatically operable according to environmental pressure, e.g. water depth. The valve is operable with a minimum of moving parts, and is pneumatically or hydraulically monitorable in its opening or closing action. This fluid monitor provides a second safety block against an accidental launching operation in addition to that of the above mentioned stem rod block. Since it has a warning switch which signals the opening of the stem rod, this allows the launching officer to countermand the launching program by means of his master control to the launching valve itself. The rates of opening and closing are carefully controlled with a minimum of moving parts. The opening rate is controlled according to the size of the orifice. The closing rate is controlled according to the spring force and piston diameter. The above combination features have solved a number of problems in underwater missile launching; namely, double safety control, a minimum of moving parts to wear out, operating points which are automatically programmed according to environmental pressure, operating rates which are precisely controllable with a very minimum of moving parts, and operation which is substantially all fluid controlled.

Hence, in sum, it will be appreciated that the instant invention provides an underwater launching control valve which has a two-way safety block, which exhibits operating points and operating rates which are precisely controlled and automatically programmed according to environmental conditions and are actuated by a fluid system with a minimum number of moving parts, and which has a fluid monitor over the entire operation of the valve. The above advantages are italicized when one realizes the problems involved in under-water missile launching, such as variations in ocean depths, the demand for foolproof and fail-safe operation, a minimum of moving parts, precisely controlled by the launching forces, and safety blocks which are quick and sure of operation, lest a missile be launched inadvertently.

It is, therefore, an object of this invention to provide an improved valve having a precisely programmed operating pressure and rate.

It is a further object to provide a positive opening safety block against the accidental launching of the missile.

Still another object is to provide a valve with an emergency lock reliably operable against tremendous back pressures.

Another object is to provide a valve with a closely controllable rate of movement.

Yet another object is to provide a valve with a pneumatically or hydraulically monitorable opening and closing point.

A further object is to provide a valve whose operating point is automatically controllable according to the environmental pressures.

Yet another object is to provide a valve which is able to vary missile launching forces according to submarine depth.

Still another object is to provide a launching valve with a minimum of moving parts.

A further object is to provide a launching valve with an operating rate which is precisely controlled substantially without moving parts.

A further object is to provide a launching valve whose operating parts are monitorable simply by means of fluid pressure upon a biased valve.

A further object is to provide a launching valve with a safety block which is explosively operable.

Yet another object is to provide a launching valve with a safety block which is operable by a solenoid.

Another object is to provide a launching valve with a double safety block including a piston block and a relief valve fluidly monitorable.

Still a further object is to provide a launching valve whose closing rate is precisely controlled according to the force of a spring and the diameter of a piston, and whose opening rate is precisely controllable by varying the size of the orifice.

Other objects and many of the attendant advantages of this invention will be readily appreciated as it becomes better understood by reference to the following detailed description when considered in connection with the accompanying drawings wherein.

Figure 1:
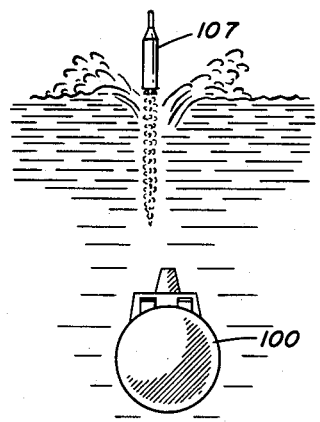
FIG. 1 is a planned view of a launched missile.

Referring now to the drawings wherein like numbers refer to like parts, there is shown in FIG. 1 a submarine which is hovering, undetected, beneath the surface of the ocean and which has just finished firing its ballistic missile. The launching action of such a firing system must produce gas pressures in the launching tube which are sufficient to propel the missile up through the ocean depths and beyond to the surface where the rocket motor can fire in the air. The missile in FIG. 1 is shown in this state having just broken the surface of the ocean and is in a "motor-initiation" state. It will be appreciated here that it is desirable to program the launching forces for the missile to vary according to the ocean pressures, that is, the depths of submersion. The invention accomplishes this and, furthermore, with a minimum of moving parts.

It will fairly be appreciated that these launching forces while precisely controlled must be of a substantial order of magnitude in order to propel an inter-continental ballistic missile which is larger than an ordinary railroad freight car and hurl it upward quickly to the surface of the ocean and several feet above.

Figure 2:
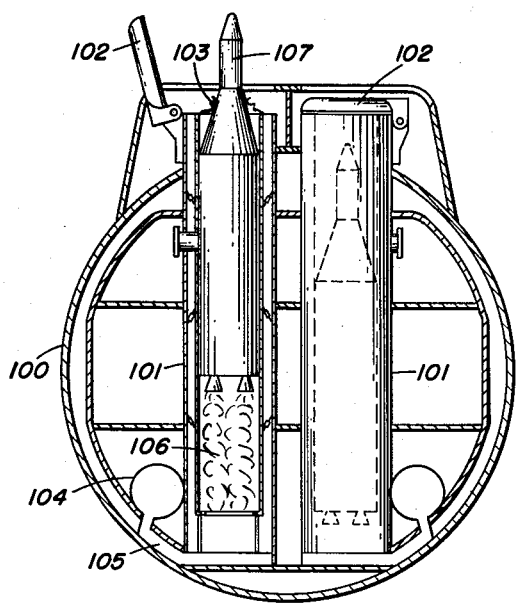
FIG. 2 is a sectional view of a submarine under water and a missile being launched.

In FIG. 2 there is shown a sectional view of the missile firing submarine beneath the surface of the water and in the process of launching an inter-continental missile. This is a typical launching environment and the invention disclosed herein is of peculiar advantage. Within the outer shell of the submarine 100 there is contained a variety of missile launcher tubes 101, loaded with missiles 107. At the signal from the firing director, the muzzle hatch 102 on the launching tube 101 is retracted and the diaphragm 103 to the launching tube is ruptured, opening the missile to the outer medium. At this point the launching valve of the invention associated with the eject pipe 105 from the launching-fluid reservoir 704 for a particular launching tube, opens and allows the launching gas to build up in the bottom section of the launcher tube as shown in 106 to propel the missile 107 upward through to the water and above the surface so it may fire and begin its inter-continental journey. It is apparent that the launching forces built up by this fluid ejection system will vary according to the size of the orifice in the launching valves, the volume and pressure of the fluid in the launching reservoir 104, as well as the opening and closing rates of the launching valves. Thus, the launching valves must be programmed, preferably automatically, to provide for the launching forces which will vary with the depth of the launching submarine.

Figure 3:
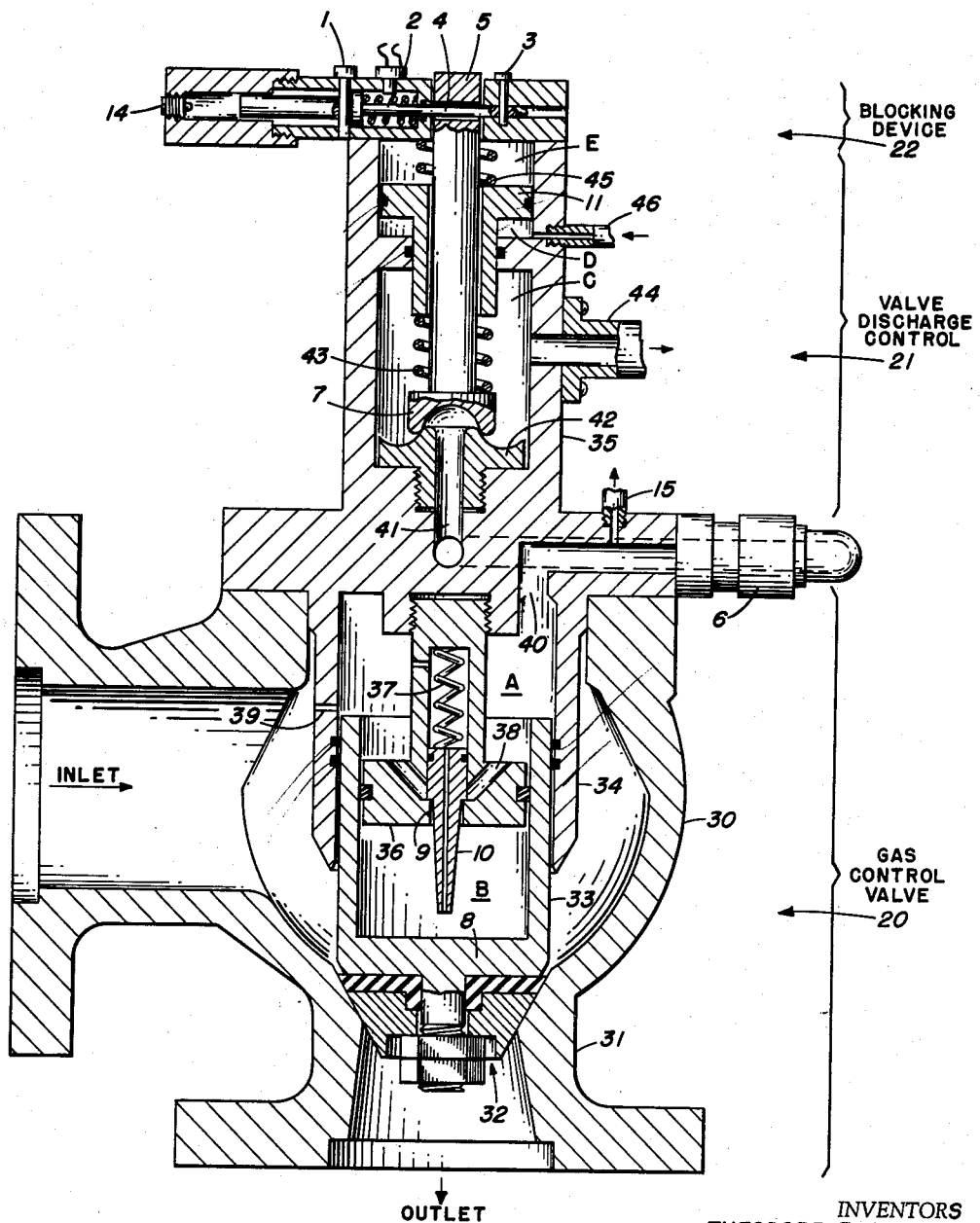
FIG. 3 is a sectional view of a launching control valve according to the invention.

In FIG. 3 there is shown a sectional view of the essential parts of the invention. Here may be seen one embodiment of the gas control valve generally indicated as 20, the discharge control valve system 21, which is to control the gas control valve and the valve blocking device, generally shown as 22, which is to provide the safety block against inadvertent or accidental operation of the launching valve system 20. The gas control valve system 20 is adapted to control the amount and the rate of flow of the launching fluid coming from its reservoir into the inlet shown, through the valve orifice and out at the outlet shown into the launching tube chamber, there to propel the missile targetward. The gas control valve system 20 includes the valve poppet 8 which is generally situated in an enlarged portion 30 of the launching fluid line and seated upon a constricted portion thereof 31. This valve poppet 8 has a head portion 32 and a lower hollow tubular portion 33 which is sealably mounted and nested within a surrounding tube 34 extending from relief housing 35. Within the tubular portion 33 there is sealably mounted a fixed piston 36 having a hollow stem in which is mounted a spring 37 and, outwardly thereof is located a tapered valve stem 10 having an orifice 9 in the top of the piston, in which orifice the valve stem 10 sits in movable relation. Passages 38 lead from orifice 9 to the opposite side of the piston 36 so as to allow fluids in chamber B to flow through the orifice 9, the fluid flow being controlled by stem 10 and spring 37, and thence through passages 38 into the chamber marked A to the side or opposite face of the piston 36. The chamber A has an aperture 39 which communicates with the inward portion of the reservoir on the fluid line from the reservoir and a second aperture which communicates through the passageway 41 in relief housing 35 and leads to the seat 42 adapted to release valve 7. The relief valve system is mounted upon a stem 5 which is movably seated in the center of relief housing 35. The housing is formed to include a chamber C at the head of this valve stem wherein the relief valve head 7 may operate against its spring 43, biasing the valve against pressurized fluid flowing from chambers B and A, outwardly, to be discharged at port 44 in the chamber C. This allows the escape of the fluid from the chamber housing the valve poppet 8 so that the valve may open, allowing the launching fluid to pass into the launching tube. Mounted against the biased spring 43 is a discharge control piston 11 sealably mounted within the relief housing 35 in a second chamber therein indicated as D and E, which are above and below the head of the piston. This piston is, in turn, biased by a spring 45 mounted within the chambers D, E and arranged to control the movement of the piston under the control pressure from an outer port adapted to admit the control pressure fluid, as for instance at 46. This control pressure acts from the underside of the control piston 11 and is resisted by the biased spring 45. The greater the control pressure, the more spring 45 is compressed and the lower the pressure needed to operate relief valve 7 becomes.

For the launch valve application, the valve discharge control will reduce the relief valve 7 setting at greater depths (i.e. higher control pressures) and cause the launch valve to stay open longer until the launch fluid reservoir pressure has dropped to a low value. Conversely, at lesser depths (i.e. lower control pressures) the relief valve setting is increased and the launch valve closes sooner at higher reservoir pressures. An alternative embodiment of this discharge control system 21 may be seen in FIG. 4.

Figure 4:
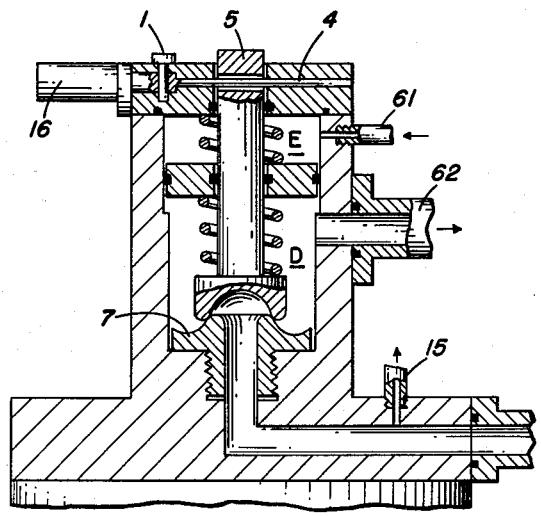
FIG. 4 is a sectional view of an alternative form of the valve block.

The valve-blocking device generally indicated at 22 includes a blocking rod 4 which extends through and fixes the motion of valve stem 5 so as to lock it and block the operation of the relief valve 7 and of the valve poppet 8. This blocking rod 4 may be actuated in any number of ways. In the embodiment, it is shown (FIG. 4) actuated by an explosive squib 2 which, on exploding, fires the rod against a shear pin 3 breaking the pin and propelling the rod beyond it and beyond the valve-stem opening in valve stem 5 so as to free the stem and its associated relief valve 7. This opens the gas control valve poppet 8. This blocking rod 4 may be actuated by a solenoid 16, as shown in FIG. 4, or even manually.

However, the actuating force should be one which is positive and fail-safe since the back pressures on this valve stem from the entire valve system may be great. Associated with the valve blocking combination is a lock pin 1 which may be inserted in the head of the valve-blocking rod 4 to fix the same before it may be fired. This lock pin is a further guarantee against the accidental firing of the explosive squib and consequent opening of valve stem 5. There is further provided a shear pin 3 as indicated above, against which the blocking rod 4 bears and which is ruptured thereby by the opening action of the blocking rod. An electrical switch 14 is shown provided at the head of the valve-blocking assembly and is connected, in this embodiment, so that signal circuit contacts will be closed when the blocking rod 4 is moved beyond the valve stem 5 to free the same. This will send a signal to the main control panel indicating the firing of the blocking rod and the unlocking of the valve stem and relief valve.

The operation of the valve and the blocking device is generally as follows: Prior to valve opening, the locking pin 1 is manually removed. The explosive squib 2 can then be fired, shearing the shear pin 3 and disengaging the blocking rod 4. An electrical switch 14, inter-connected to the valve firing cycle circuitry, is closed when the blocking rod 4 is fully disengaged from the relief valve stem 5. All chambers of the valve up to the explosive valve 6 contain high pressure gas. The valve is opened by firing the explosive valve 6 which permits gas from chambers A and B to be discharged through the relief valve 7 to the outer atmosphere. The pressures in chambers A and B drop until the pressure forces on the valve poppet 8 are unbalanced in the opening direction, causing the poppet to open the aperture through which the launch fluid may escape to launch the missile. The opening rate is programmed by the gas flow through the orifice 9, past tapered stem 10. The setting of the relief valve 7 determines the pressure at which the valve will close. When the pressure within chamber A drops to the relief-valve-setting, the relief valve closes. A further drop in pressure of the launching fluid flowing through the valve causes the poppet 8 to be unbalanced in the closing direction and the valve then closes. The setting of the relief valve 7 and, therefore, the pressure at which the relief valve closes, is determined by the position of the valve-discharge-control piston 11. The control pressure acts on the other side of the control piston 11 and is resisted by the biased spring 45, which control pressure will determine the opening pressure of relief valve 7, since it controls the back-pressure on this valve stem 5.

From the above it should be apparent that the valve discharge and blocking device as disclosed above will automatically compensate for changes in launching depths and change the launch valve-closing time to suit. By proper selection of the diameter of the control piston 11, and the force of the spring 45, a particular depth-closing time program can be obtained. In addition, the valve discharge control and block will give positive blocking of the relief valve before it is desired to open the launch valve, even if the explosive valve should be fired. This effects a doubly safe valve block. A pressure switch 15 may be provided between the explosive valve 6, which opens the escape aperture 41 and leads to the relief valve 7, to give a warning signal if the explosive valve is fired while the relief valve is blocked.

FIG. 4 shows in sectional view an alternative form of the valve blocking device. Whereas the valve block in FIG. 3 was actuated by an exploding squib, the block is actuated in this figure by a solenoid, as at 16, which propels the rod out of engagement with the valve stem and allows the relief valve 7 to operate. There is no shear pin in this embodiment. The solenoid here would be actuated by means of a current actuating device which would send current through a coil surrounding the rod and the inductive force would propel the rod in the desired direction. In this figure also is shown a modified form of the controlled pressure system. In this figure the controlled pressure chambers D and E are reversed, such that the E chamber now, as before, on the upper side of the discharge control piston 11, is connected to the control pressure line through a port 61. This is the reverse of the case of FIG. 4 where the control pressure is applied on the lower side of piston 11 in chamber D. The action here is substantially the same except that the propelling force is in the closing direction of relief valve 7 as opposed to the opening direction in the form shown on FIG. 4. Furthermore, the C and D chambers shown in FIG. 3 are combined in this form into one chamber D which is vented to the atmosphere so as to bleed off the fluid in the A and B chambers when the valve poppet 8 opens pushing the fluid up past relief valve 7 and out through its atmospheric vent through this port 62. Other similar modified forms of this system will be apparent from consideration of the disclosures above.

Figure 5:
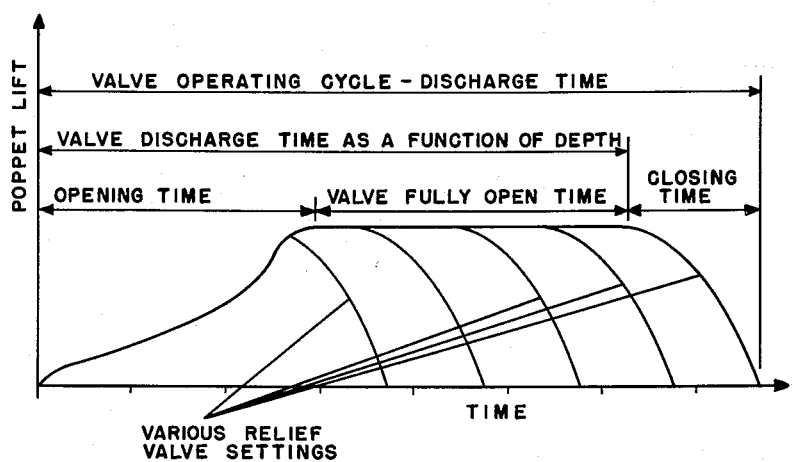
FIG. 5 is a graph plotting valve operation against time.

In FIG. 5 there is shown a graph plotting valve operation time. The abscissa is a time axis and the ordinate is a plot of the degree of opening of the poppet valve 8. Therefore, at the origin the poppet valve is closed; that is, there is a zero reading along the ordinate axis. Similar curves are plotted as representative of various relief-valve settings, which settings would vary the valve fully opened time. This is illustrative of how by varying the relief valve settings, the fully open time of which the flat plateau is illustrative, may be varied according to the requirements of launching depth, missile weight, etc. In a representative embodiment these families of curves which correspond to settings of variable relief valve discharge time as a function of submarine depth.

Figure 6:
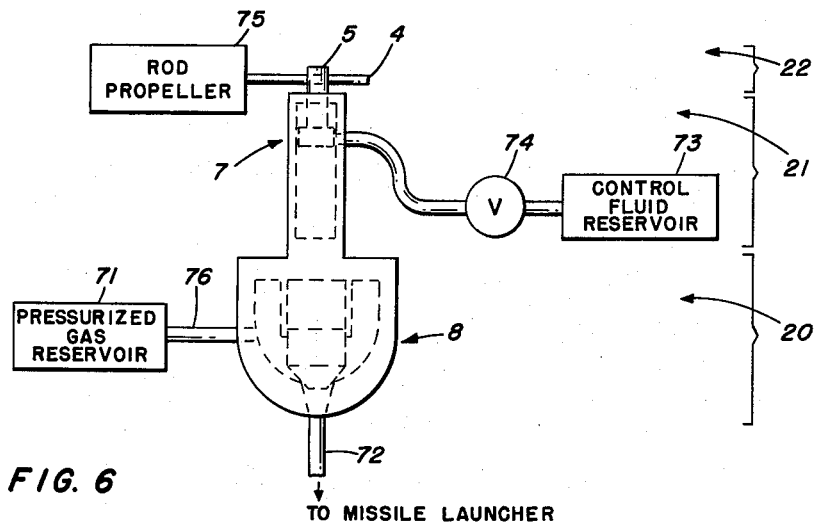
FIG. 6 is a schematic drawing of the launching valve system in toto.

In FIG. 6 there is shown schematically the environment of, and supplemental systems cooperating with, the poppet valve. This figure has been included to graphically illustrate in cooperating relationship the interrelationship of the different components in the launching system for any given missile launching tube. The system basically is set up to control the discharge of pressurized gas in a reservoir 71 along discharge lines 76, through the control poppet valve 8 and out into the missile launching tube, as for instance at 72. The poppet valve is, of course, the primary operator here and is itself controlled by other components. As is shown schematically the poppet valve 8 may be lifted out of the line of flow traversing line 76 in varying degrees providing a varying amount of eject fluid flow. Controlling the lifting action of this poppet valve in a fluid fashion is a relief valve 7 which in turn has a valve stem 5, which valve in turn, is blocked by blocking rod 4 for emergency purposes as spelled out above. Schematically shown at 75 is the rod-propelling device actuable by a pressurized fluid, explosives, solenoid, manually, etc. To control the action of the relief valve is shown a control fluid reservoir at 73 with its control valve 74. This system moves the relief valve up or down according to the desired lifting action for poppet valve 8. The embodiment illustrated uses a fluid to push a piston up or down against a spring bias and so to move the valve stem 5, to which the piston is attached, up or down and accordingly move its attached relief valve head 7. This, obviously, allows the exit of pressurized fluid associated with the chamber surrounding poppet valve 8 to escape, thereby causing valve 8 to lift up and open the launching fluid line 76, the desired functional result for the entire system. For clarity, it should be recognized that there are three functionally distinct systems here, namely the main or poppet valve system as indicated at 20, the control valve system as indicated at 21, and the blocking valve system as indicated at 22.

Figure 7:
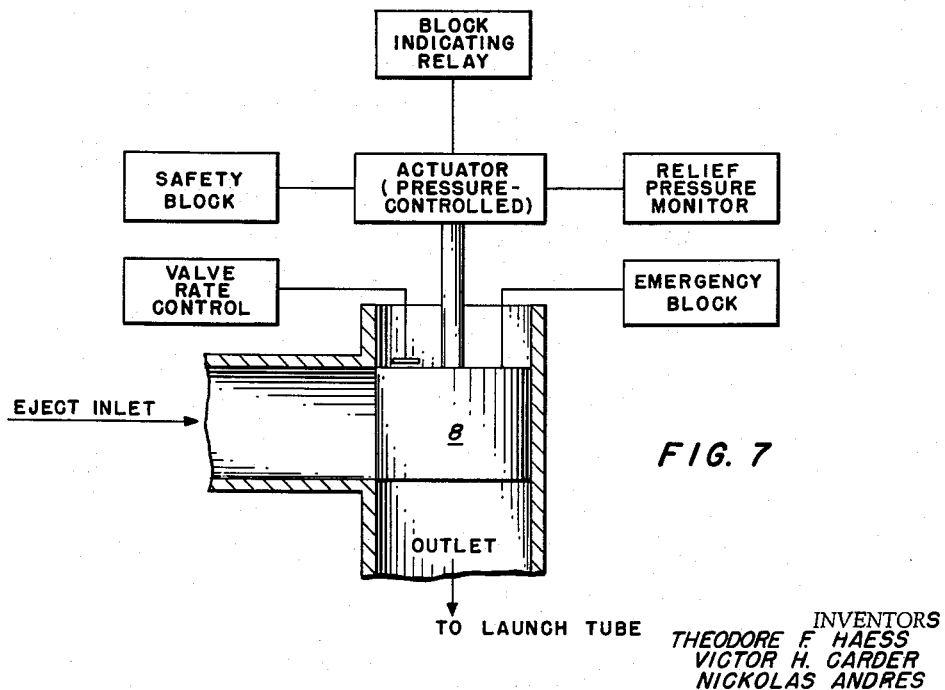
FIG. 7 is a planned view of the operational elements of the launching valve proper.

In FIG. 7 there is shown a block-diagram schematic view of the several functionally distinct systems within the valve system itself. The eject inlet is shown as blocked off by a poppet valve 8 through which it must flow to traverse the outlet into the launching chamber. Poppet valve 8 itself is shown as primarily controlled by actuator-pressure-control system (the relief valve in the above embodiments). This actuator system itself has a pressure control system arranged to hydraulically monitor the relieving action of the actuator system which, in turn, allows pressurized poppet valve system 8 to retract. (This is analogous to the relief valve 7 and its control system 73 and 74 as shown in FIG. 6.) The actuator system is further controlled by a safety block device (the explosive rod with its insertable pin seen above). There is also a block-indicating relay tied into the actuator system to indicate the open or closed condition of safety block. A separate emergency blocking system is shown as controlling poppet valve 8 (this is analogous to the emergency explosive valve 6 seen above). A further function control of valve 8 is the valve-rate control. This is analogous to the dimensionally-variable orifice system 9 and 38 associated with stem 10 in the above embodiment.

It is to be understood, of course, that the foregoing relates only to the preferred embodiment of the invention and that various and other modifications and alterations may be made therein without departing from the spirit and scope of the invention.

From the above it is apparent that the applicants have invented a new and improved valve control and blocking system wherein the inventive features comprise: An automatic, hydraulically operable valve whose operation may be set to respond differently at varying depths of submersion of the system, whose opening and closing rates may be carefully programmed to effect this response, which operates substantially without the use of moving parts, which is constantly monitorable, hydraulically, as to its opening and closing points and rates by an external hydraulic control system which includes a safety valve block which is quickly and positively actuable despite extreme back pressures, preventing inadvertent actuation of the valve, and which also has a second emergency valve block for the valve control fluid per se, as an auxiliary to the first safety block overriding the movement of the valve actuating means.

The principles of the instant invention have wide application in the design and modification of ruggedized precise control valves for high pressure fluid systems wherein safety of operation, a minimum of moving parts, constant and precise control and automatically programmed operation are desirable. Such applications obviously include many hydraulic linkage systems as, for example, in the missile launching art in missile launchers, servo mechanisms, missile guidance controls and other such demanding environments.

Obviously many modifications and variations of the invention are possible in light of the above teaching. It is, therefore, to be understood that the scope of this invention is to be considered as limited only by the scope and spirit of the following claims.

What is claimed is:

1. In a self-pressurized and hydraulically controlled device, the combination comprising;
   a valve body,
   a high pressure fluid passage extending through said valve body,
   said passage having an inlet and an outlet, said valve body having a first chamber therein,
   said first chamber having a restrictive means for providing fluid communication between said inlet and said first chamber,
   a normally closed cup-shaped poppet valve sealably and slidably disposed within said first chamber and movable into said passage to interrupt fluid communication between said inlet and said outlet,
   a piston head means fixedly secured to said valve body and disposed within said first chamber for sealably and slidably coacting with said cup-shaped poppet valve, thereby to form a second chamber between said cup-shaped poppet valve and said piston head,
   said piston head having an aperture therethrough for providing fluid communication between said first chamber and said second chamber,
   a control valve having a tapered stem disposed within said aperture for controlling the rate of flow of fluid from said second chamber to said first chamber within predetermined limits,
   a discharge port in said valve body,
   a vent conduit means within said valve body for establishing fluid communication between said first chamber and said discharge port,
   a relief valve means disposed within said valve body for controlling the flow of fluid in said vent conduit means,
   fluid actuated biasing means for biasing said relief valve means closed,
   said fluid actuated biasing means including a movable wall which forms at least one wall of a chamber in said valve body in juxtaposition to said relief valve means, said chamber being in fluid communication through a control port with a source of control fluid to cause actuation of said movable wall and control the actuation of said relief valve means whereby the length of time said relief valve means remains open may be varied in accordance with environmental conditions, and
   explosively actuated blocking means connected to said relief valve means for preventing actuation of said relief valve means prior to the actuation of said blocking means.

2. In a valve device the combination comprising;
   a valve body,
   said valve body having a first chamber therein,
   a high pressure fluid passage extending through said valve body,
   said passage having an inlet and an outlet,
   a valve means sealably and slidably disposed within said first chamber in said valve body for movement to a closed position to interrupt fluid flow along said passage,
   said valve body having a restrictive means for providing fluid communication between said inlet and said first chamber,
   a hydraulically controlled relief valve means disposed in said valve body and in fluid communication with said first chamber for venting said first chamber,
   hydraulically actuated biasing means operatively connected to said relief valve means and in fluid communication through a control port so disposed to be in fluid communication with a source of control fluid for determining in accordance with the environmental factors surrounding said valve body, the length of time said relief valve means is open,
   explosively actuated blocking means operatively connected to said relief valve means for preventing the operation of said relief valve means before said blocking means is actuated, and
   signal means operatively connected to said blocking means for indicating that said blocking means has been actuated.

3. The combination of structure as recited in claim 2 wherein said valve means comprises;
   a cup-shaped-cylindrical poppet disposed in said first chamber,
   a valve seat disposed in said passage for receiving said poppet,
   a piston head connected to said valve body within said first chamber for sealably and slidably coacting with the cup-shaped poppet thereby forming a second chamber between said piston means and said cup-shaped poppet,
   said piston head having an aperture therethrough for providing fluid communication between said first and second chambers, and
   a spring biased tapered stem means disposed in said aperture for opening said aperture in varying degrees of magnitude depending upon the pressures in said first and second chambers.

4. The combination of structure is recited in claim 2 wherein said relief valve means and said hydraulic biasing means comprises;
   said valve body having a discharge chamber,
   a convex valve seat disposed in said discharge chamber,
   said valve body having a discharge port for venting said discharge chamber,
   said valve body having an environmental fluid chamber in juxtaposition to said discharge chamber,
   a control piston stalably and slidably disposed in said fluid chamber to divide said fluid chamber into an upper chamber and a lower chamber,
   said valve body having a bore connecting said discharge chamber with said fluid chamber,
   said control piston having an extension disposed in said lower chamber and being in sealing and sliding relationship with said bore,
   a concave valve head disposed in said discharge chamber for seating upon said convex valve seat,
   a valve stem connected to said concave valve head and extending through said control piston,
   resilient means disposed between said concave valve head and said control piston,
   spring biasing means disposed in said upper chamber to act upon said control piston, and
   control fluid port means in said valve body and connected to said lower chamber for providing fluid communication between said lower chamber and said exterior of said valve body for determining said length of time said concave valve head is off said convex valve seat in accordance with said environmental factors surrounding said valve body.

5. The combination of structure recited in claim 2 wherein said blocking means comprises;
   a rod slidably disposed through said relief valve means,
   a breech juxtaposed to said relief valve means,
   a head attached to said rod and slidably disposed in said breech,
   an explosive squib disposed in said breech to create pressure against said head when ignited for moving said rod out of engagement with said relief valve means, and
   said signal means including a switch means disposed in said breech for indicating the disengagement of said rod with said relief valve means.

6. The combination of structure as recited in claim 2 wherein said hydraulically controlled relief valve means and said hydraulic biasing means comprises;
   said valve body having a relief valve chamber,
   a convex valve seat disposed in said relief valve chamber,
   a concave valve head disposed in said relief valve chamber for seating upon said convex valve seat,
   a valve stem connected to said concave valve head,
   a control piston sealably and slidably disposed in said relief valve chamber,
   said valve stem being disposed so as to pass through said control piston in a sealing and sliding relationship,
   a spring disposed about said valve stem between said concave valve head and a first side of said control piston,
   a discharge port disposed in said valve body on said first side of said control piston for venting said relief valve chamber, and
   control fluid port means disposed in said valve body on the other side of said control piston for admitting control fluid into said relief valve chamber to act on said other side of said piston whereby the control piston is moved against said spring thereby to control the pressure necessary to force said concave valve head off the convex valve seat for venting said first chamber.

7. In a self-pressurized valve operable by a hydraulically controlled relief valve, the combination comprising:
   a valve body,
   a high pressure fluid passage extending through said valve body,
   said passage having an inlet and an outlet,
   said valve body having a first chamber therein,
   said first chamber having a restrictive means for providing fluid communication between said inlet and said first chamber,
   a cup-shaped poppet valve sealably and slidably disposed within said first chamber and movable into said passage,
   a fixed hollow piston head secured to said valve body within said first chamber for sealably and slidably coacting within said cup-shaped poppet valve thereby forming a second chamber between said cup-shaped poppet valve and said fixed hollow piston head,
   said piston head having a pressure relief passage extending therethrough for providing fluid communication between said first and second chambers,
   a tapered-stem valve disposed in said hollow piston head for movement into said pressure relief passage to control the flow of fluid from said second chamber to said first chamber,
   biasing means disposed within said hollow piston head for biasing said stem valve into said pressure relief passage,
   said valve body having a discharge chamber,
   said valve body having a conduit means for establishing fluid communication between said first chamber and said discharge chamber,
   a convex valve seat disposed within said discharge chamber,
   said conduit means being disposed so as to pass through said convex valve seat,
   a concave valve head disposed within said discharge chamber for seating engagement with said convex valve seat thereby to control the fluid flowing from said first chamber through said conduit means,
   said valve body having a fluid chamber in juxtaposition to said discharge chamber,
   said valve body having a bore connecting said discharge chamber with said fluid chamber,
   a valve stem connected to said concave valve head and passing through said discharge chamber, said bore, and said fluid chamber and into said valve body,
   a control piston sealably and slidably disposed within said fluid chamber for movement along said valve stem,
   said control piston dividing said fluid chamber into an upper chamber and a lower chamber,
   said control piston having an extension leading from said control piston in said lower chamber and being in sealing and sliding relationship with said bore,
   a first spring disposed in said upper chamber along said valve stem,
   a second spring disposed about said valve stem between said control piston and said valve head,
   biasing means including a port means in said valve body to admit control fluid into said lower chamber to act upon said piston for controlling the force transmitted through said second spring to said valve head thereby to vary the amount of pressure in said conduit means required to open said relief valve means,
   said valve body having a discharge port means for venting said discharge chamber of fluid received from said conduit means,
   a rod slidably disposed in said valve body and passing through said valve stem,
   a breech juxtaposed to said fluid chamber,
   a head attached to said rod and slidably disposed in said breech,
   an explosive squib disposed in said breech to create pressure against said head when said squib is ignited for moving said rod out of engagement with said valve stem whereby said concave valve head is freed to move off said convex valve seat, and
   signal means connected to said breech for indicating that said rod has been removed from said valve stem as a result of ignition of said squib.

References Cited in the file of this patent
UNITED STATES PATENTS

| 781,913 | Schutte | Feb. 7, 1905 |
| 1,598,166 | Stewart | Aug. 31, 1926 |
| 2,043,453 | Vickers | June 9, 1936 |
| 2,684,830 | Stephany | July 27, 1954 |
| 2,809,051 | Jackson | Oct. 8, 1957 |
| 3,017,894 | Chilcoat | Jan. 23, 1962 |

FOREIGN PATENTS

| 10,012 | Great Britain | May 19, 1893 |